(12) United States Patent
Sakai et al.

(10) Patent No.: US 12,186,839 B2
(45) Date of Patent: Jan. 7, 2025

(54) METAL LAMINATING AND MODELING METHOD

(71) Applicants: MITSUBISHI HEAVY INDUSTRIES COMPRESSOR CORPORATION, Tokyo (JP); Yamazaki Mazak Corporation, Aichi (JP)

(72) Inventors: Yasunori Sakai, Hiroshima (JP); Kazuhiro Ishibashi, Aichi (JP); Yasuyuki Tanaka, Aichi (JP); Atsushi Suzuki, Aichi (JP); Seigo Ouchi, Aichi (JP)

(73) Assignees: MITSUBISHI HEAVY INDUSTRIES COMPRESSOR CORPORATION, Tokyo (JP); Yamazaki Mazak Corporation, Aichi (JP)

( * ) Notice: Subject to any disclaimer, the term of this patent is extended or adjusted under 35 U.S.C. 154(b) by 649 days.

(21) Appl. No.: 17/178,871

(22) Filed: Feb. 18, 2021

(65) Prior Publication Data

US 2021/0260681 A1 Aug. 26, 2021

(30) Foreign Application Priority Data

Feb. 21, 2020 (JP) ................................. 2020-028059

(51) Int. Cl.
 *B23K 9/04* (2006.01)
 *B23K 37/04* (2006.01)
 *B33Y 10/00* (2015.01)
(52) U.S. Cl.
 CPC .......... *B23K 9/042* (2013.01); *B23K 37/0461* (2013.01); *B33Y 10/00* (2014.12)
(58) Field of Classification Search
 CPC .... B23K 9/042; B23K 9/046; B23K 37/0461; B23K 2101/04; B23K 28/02; B33Y 10/00; B22F 12/37; Y02P 10/25
 See application file for complete search history.

(56) References Cited

U.S. PATENT DOCUMENTS 11,400,535 B2 * 8/2022 Yamasaki .............. B23K 15/02
2017/0182715 A1 6/2017 Haida
(Continued)

FOREIGN PATENT DOCUMENTS

EP 1354658 A2 10/2003
EP 3725446 A1 10/2020
(Continued)

OTHER PUBLICATIONS

European Search Opinion, Jul. 20, 2021, European Patent Office (Year: 2021).*

(Continued)

*Primary Examiner* — Dana Ross
*Assistant Examiner* — Kevin Guanhua Wen
(74) *Attorney, Agent, or Firm* — Osha Bergman Watanabe & Burton LLP

(57) ABSTRACT

A metal laminating and modeling method includes a first inclination angle modeling step including a first inclination step of setting a table on which the metal layers are to be formed at a first table inclination angle and setting a welding torch at a first torch inclination angle and a first welding step of forming a weld bead that becomes a part of the modeled object by arc welding with the welding torch and a second inclination angle modeling step including a second inclination step of inclining the table at a second table inclination angle that is larger than the first table inclination angle and setting the welding torch at a second torch inclination angle and a second welding step of forming the weld bead.

3 Claims, 9 Drawing Sheets

(56) References Cited

U.S. PATENT DOCUMENTS

| | | | |
|---|---|---|---|
| 2019/0134732 A1 | | 5/2019 | Sakai et al. |
| 2019/0375011 A1 | * | 12/2019 | Nakamura et al. ..... B22F 3/105 |
| 2019/0389004 A1 | | 12/2019 | Yamasaki |
| 2020/0324357 A1 | | 10/2020 | Sakai |

FOREIGN PATENT DOCUMENTS

| | | | | | |
|---|---|---|---|---|---|
| JP | S6-19974 | A | | 1/1986 | |
| JP | 3784539 | B2 | | 6/2006 | |
| JP | 2007275945 | A | * | 10/2007 | |
| JP | 2007275945 | A1 | * | 10/2007 | ............. B21D 37/20 |
| JP | 2013146753 | A | * | 8/2013 | |
| JP | 2015-182083 | A | | 10/2015 | |
| JP | 2017-119402 | A | | 7/2017 | |
| JP | 2019-084553 | A | | 6/2019 | |
| JP | 2019136711 | A1 | * | 8/2019 | ............... B23K 9/04 |
| JP | 2019150857 | A1 | * | 9/2019 | ............. B23K 37/04 |
| JP | 2020-006681 | A | | 1/2020 | |
| JP | 2020-171946 | A | | 10/2020 | |

OTHER PUBLICATIONS

Machine translation of JP 2007275945 A1 performed on Apr. 26, 2024, Tanaka et al. (Year: 2007).*
Machine translation of JP 2019136711 A1 performed on Apr. 26, 2024, Sato et al. (Year: 2019).*
Machine translation of JP 2019150857 A1 performed on Apr. 26, 2024, Fujii et al. (Year: 2019).*

* cited by examiner

METAL LAMINATING AND MODELING METHOD

BACKGROUND OF THE INVENTION

Field of the Invention

The present disclosure relates to a metal laminating and modeling method.

Priority is claimed on Japanese Patent Application No. 2020-028059, filed on Feb. 21, 2020, the content of which is incorporated herein by reference.

Description of Related Art

As one of 3D printing (three-dimensional modeling) techniques, a technique of laminating and modeling metal has been developed and put into practical use. As this kind of metal laminating and modeling method, a molten metal laminating method in which a modeled object is formed by laminating metal layers using metal melted by an arc discharge has been developed. The metal layers are formed by forming weld beads using the metal melted by an arc discharge and arranging a plurality of these weld beads.

For example, Japanese Patent No. 3784539 describes a method for manufacturing a die in which a three-dimensional die material is modeled with weld beads based on the shape data of the die. In this method for manufacturing a die, the die material is formed by laminating weld beads while moving a welding torch attached to a movable frame of an NC processing machine. The formed die material is finished with a cutting tool or a polishing tool, thereby manufacturing a die having a desired shape.

SUMMARY OF THE INVENTION

By the way, in the configuration described in Japanese Patent No. 3784539, the welding torch is provided in the gate-shaped frame through a horizontal frame. Therefore, in the case of intending to form a large modeled object, there is a problem in that the gate-shaped frame becomes large and the entire apparatus for carrying out the metal laminating and modeling method becomes large.

The present disclosure provides a metal laminating and modeling method capable of enabling the formation of large modeled objects while suppressing an increase in the sizes of apparatuses.

A metal laminating and modeling method according to an aspect of the present disclosure is a metal laminating and modeling method for forming a modeled object by sequentially laminating metal layers, the method including a first inclination angle modeling step including a first inclination step of setting a table on which the metal layers are to be formed at a first table inclination angle and setting a welding torch at a first torch inclination angle and a first welding step of forming a weld bead that becomes a part of the modeled object by arc welding with the welding torch and a second inclination angle modeling step including a second inclination step of inclining the table at a second table inclination angle that is larger than the first table inclination angle and setting the welding torch at a second torch inclination angle set according to the second table inclination angle and a second welding step of forming the weld bead by arc welding with the welding torch.

According to the metal laminating and modeling method of the present disclosure, it becomes possible to enable the formation of large modeled objects while suppressing an increase in the sizes of apparatuses.

DETAILED DESCRIPTION OF THE INVENTION

Hereinafter, an embodiment for carrying out a metal laminating and modeling method according to the present invention will be described with reference to drawings. However, the present invention is not limited only to this embodiment.

(Overall Configuration of Modeling System)

Figure 1:
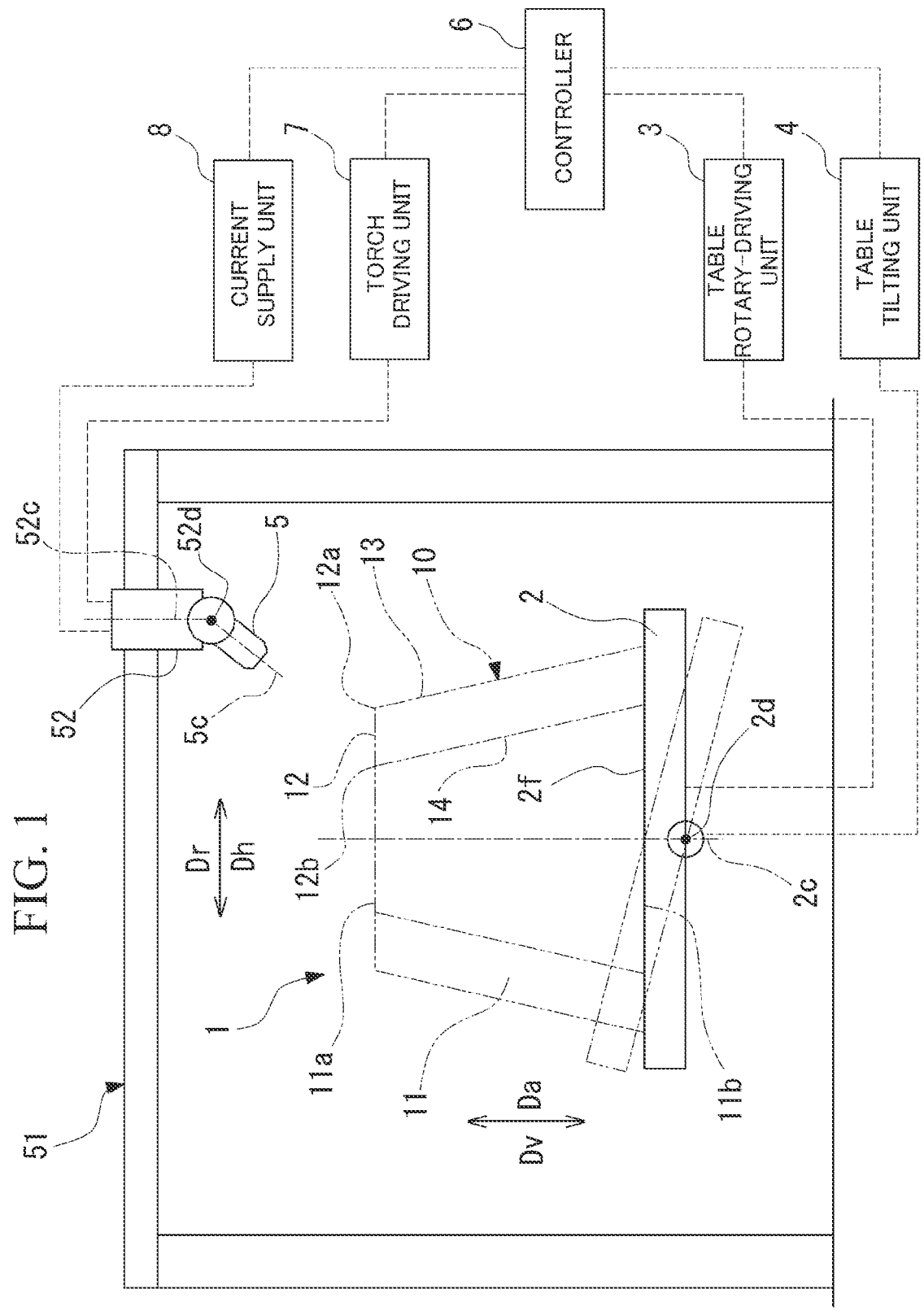
FIG. 1 is a schematic view showing the configuration of a modeling system for forming a modeled object using a metal laminating and modeling method according to an embodiment of the present invention.

FIG. 1 is a schematic view showing the configuration of a modeling system for forming a modeled object using a metal laminating and modeling method according to the embodiment of the present invention. As shown in FIG. 1, a modeling system 1 of the present embodiment includes a table 2, a table rotary-driving unit 3, a table tilting unit 4, a welding torch 5, a controller 6, a torch driving unit 7, and a current supply unit 8. The modeling system 1 has a machining center or the like capable of carrying out so-called numerical control (NC).

(Configuration of Table)

The table 2 has a table upper surface 2f facing upward in the vertical direction Dv. The table upper surface 2f is a flat surface extending from a central axis 2c of the table 2 as the center in a direction orthogonal to the central axis 2c. On the table upper surface 2f, metal layers 11m (refer to FIG. 7) intended to form a modeled object 10 are sequentially laminated and formed. The table 2 is configured to be rotatable around the central axis 2c. The table 2 is configured to be tiltable around a tilting axis 2d such that the central axis 2c inclines with respect to the vertical direction Dv. The table 2 is in the horizontal state when the central axis 2c extends in the vertical direction Dv and the table upper surface 2f is directed upward in the vertical direction Dv.

The table rotary-driving unit 3 rotates the table 2 around the central axis 2c. The table tilting unit 4 tilts the table 2 around the tilting axis 2d. The table tilting unit 4 inclines the table 2 in the horizontal state at a random table inclination angle such that the table upper surface 2f faces a direction intersecting with the vertical direction Dv. Here, the table inclination angle is an angle formed by the horizontal plane and the table upper surface 2f.

(Configuration of Welding Torch)

The welding torch 5 forms weld beads 100 by arc welding in which a weld wire is melted by an arc generated in a shielding gas (inert gas). The welding torch 5 is configured to be movable relative to the table 2. The welding torch 5 is fixed to, for example, a torch holding member 52 attached to a gate-shaped frame 51. The torch holding member 52 is configured to be movable with respect to the frame 51 in the vertical direction Dv and in the horizontal direction Dh orthogonal to the vertical direction Dv. The torch holding member 52 is configured to be movable in, as the horizontal direction Dh, a horizontal first direction and a horizontal second direction (not shown) orthogonal to each other in the horizontal plane orthogonal to the vertical direction Dv. In addition, the torch holding member 52 holds the welding torch 5 to be capable of rotating around a holding member rotating axis 52c that extends in the vertical direction Dv. Furthermore, the torch holding member 52 is configured to be capable of rotating the welding torch 5 around a torch tilting axis 52d and inclining the welding torch 5 such that a torch central axis 5c of the welding torch 5 tilts with respect to the vertical direction Dv.

The torch driving unit 7 drives the torch holding member 52, thereby moving the welding torch 5 in the vertical direction Dv and in the horizontal direction Dh with respect to the table 2. The torch driving unit 7 rotates the torch holding member 52 around the holding member rotating axis 52c, thereby rotating the welding torch 5. The torch driving unit 7 rotates the torch holding member 52 around the torch tilting axis 52d, thereby inclining the welding torch 5 with respect to the horizontal plane. Therefore, the torch driving unit 7 is configured to be capable of inclining the welding torch 5 at a random torch inclination angle. Here, the torch inclination angle is the angle between the holding member rotating axis 52c (vertical direction Dv) and the torch central axis 5c.

The current supply unit 8 supplies a current to the weld wire in the welding torch 5. The current supply unit 8 is configured to be capable of adjusting the value of the current that is supplied to the welding torch 5 to a random magnitude.

The welding torch 5 melts the weld wire by arc welding over the table 2 rotating around the central axis 2c, thereby forming the weld beads 100 on the table upper surface 2f of the table 2 or a metal layer 11m laminated on the table upper surface 2f. The weld beads 100 formed as described above form an arc shape (annular shape) that is continuous in the circumferential direction around the central axis 2c of the table 2.

(Configuration View of Hardware of Controller)

Figure 2:
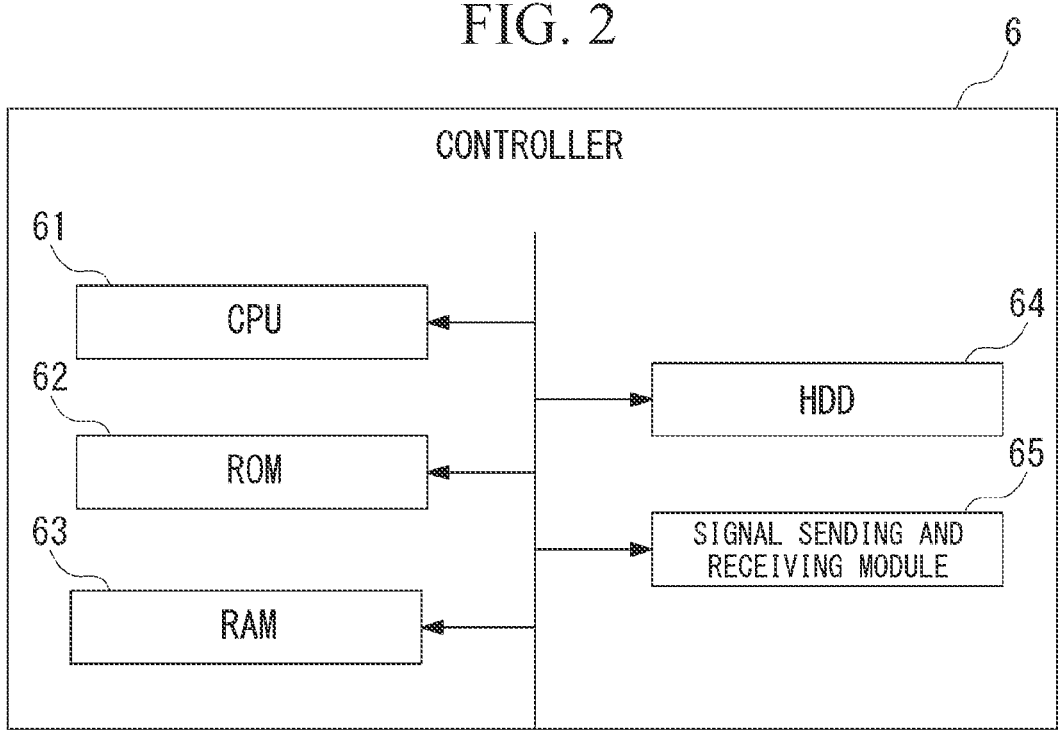
FIG. 2 is a view of the configuration of the hardware of a controller in the modeling system according to the embodiment of the present disclosure.

The controller 6 controls the individual portions of the modeling system 1. Specifically, the controller 6 of the present embodiment controls the rotating operation of the table 2 with the table rotary-driving unit 3, the tilting operation of the table 2 with the table tilting unit 4, the moving operation, rotating operation, and tilting operation of the welding torch 5 with the torch driving unit 7, and conditions for forming the weld beads 100 with the welding torch 5 (so-called welding conditions). As shown in FIG. 2, the controller 6 is a computer including a central processing unit (CPU) 61, a read only memory (ROM) 62, a random access memory (RAM) 63, a hard disk drive (HDD) 64, a signal sending and receiving module 65, and the like. The signal sending and receiving module 65 receives a detection signal from each sensor (not shown) provided in the table rotary-driving unit 3, the table tilting unit 4, the torch driving unit 7, the current supply unit 8, and the like.

(Functional Block Diagram of Controller)

Figure 3:
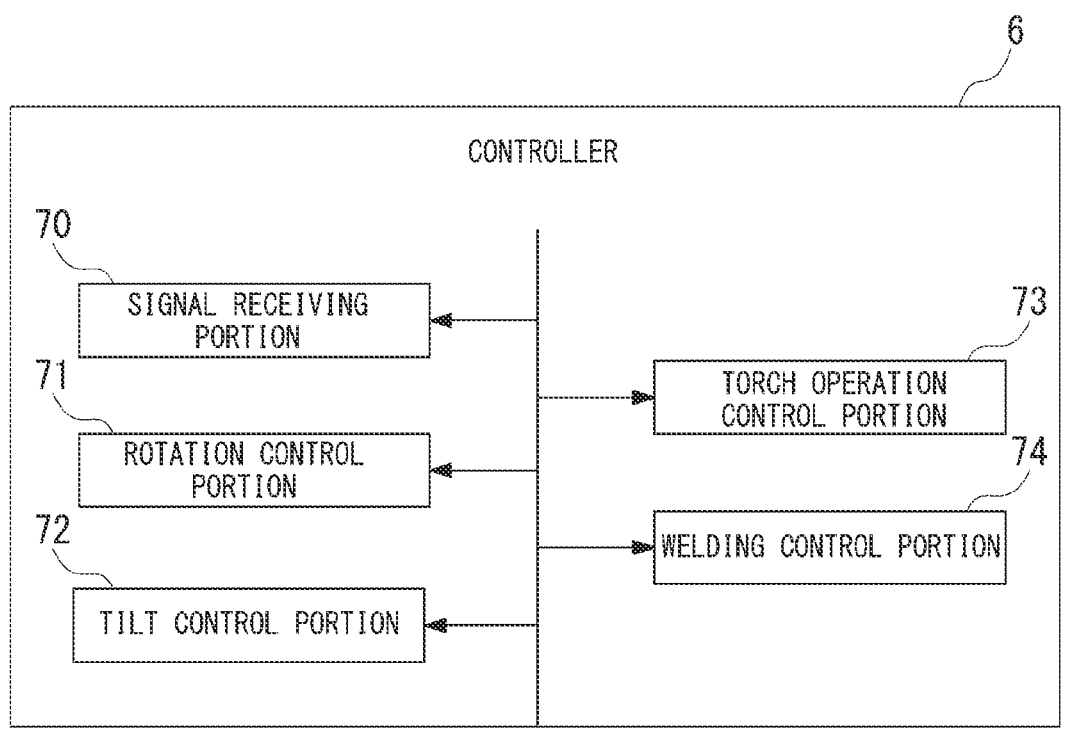
FIG. 3 is a functional block diagram of the controller in the modeling system according to the embodiment of the present disclosure.

As shown in FIG. 3, the controller 6 causes the CPU 61 to execute a program stored in advance in the controller, thereby realizing the functional configuration of each of a signal receiving portion 70, a rotation control portion 71, a tilt control portion 72, a torch operation control portion 73, and a welding control portion 74.

The signal receiving portion 70 receives detection signals from the table rotary-driving unit 3, the table tilting unit 4, the torch driving unit 7, and the current supply unit 8 using the signal sending and receiving module 65.

The rotation control portion 71 controls the table rotary-driving unit 3 based on a detection signal received by the signal receiving portion 70. Therefore, the rotation control portion 71 controls the rotating operation of the table 2 around the central axis 2c. The rotation control portion 71 controls the start and stop of the rotation of the table 2. In addition, the rotation control portion 71 controls the welding speed of the welding torch 5 by controlling the rotation speed of the table 2.

The tilt control portion 72 controls the table tilting unit 4 based on a detection signal received by the signal receiving portion 70. Therefore, the tilt control portion 72 controls the tilting operation of the table 2 such that the table upper surface 2f (refer to FIG. 1) tilts with respect to the horizontal plane.

The torch operation control portion 73 controls the operation of the torch driving unit 7 based on a detection signal received by the signal receiving portion 70. Therefore, the torch operation control portion 73 controls the operation of the welding torch 5 so as to change the relative position and posture with respect to the table 2. The torch operation control portion 73 moves the torch holding member 52 in the vertical direction Dv or in the horizontal direction Dh with, for example, the torch driving unit 7, thereby moving the relative position of the welding torch 5 with respect to the table 2. In addition, the torch operation control portion 73 rotates the torch holding member 52 around the holding member rotating axis 52c or tilts the torch holding member 52 around the torch tilting axis 52d with the torch driving unit 7. Therefore, the torch operation control portion 73 changes the posture of the welding torch 5 with respect to the table 2 and controls the target position of welding arc. In addition, the torch operation control portion 73 controls a weaving condition that adjusts the width or shape of the weld bead 100 by, for example, reciprocating the torch holding member 52 in the radial direction from the central axis 2c of the table 2.

The welding control portion 74 controls the supply of a welding current to the welding torch 5 in the current supply unit 8 based on a detection signal received by the signal receiving portion 70. The welding control portion 74 is configured to be capable of adjusting the magnitude of the welding current that is supplied to a heat source for the welding torch 5 for melting the weld wire. The welding control portion 74 also controls a variety of welding conditions in the welding torch 5. Examples of the welding conditions that the welding control portion 74 controls include the arc voltage, the pulse current, the preheating temperature of the weld wire (base material), the temperature between passes, the surface roughness of the modeled object 10 in the middle of modeling, the feed rate of the weld wire, the diameter of the weld wire, the protrusion length of the weld wire, the composition or flow rate of the shielding gas, and the like. The welding control portion 74 controls at least one of the above-described welding conditions.

(Modeled Object)

As shown in FIG. 1, the modeled object 10 that is formed with the above-described modeling system 1 is formed on the table 2. The modeled object 10 of the present embodiment has a tubular portion 11 having a cylindrical shape. As the modeled object 10 having the tubular portion 11, for example, casings of rotary machinery such as a turbine or a compressor and nozzles that form suction ports or ejection ports in these casings are exemplified. The tubular portion 11 is formed on the table upper surface 2f in a state in which the axial line thereof is aligned with the central axis 2c. The tubular portion 11 extends in an axial direction Da in which the axial line extends. The axial direction Da of the present embodiment is a direction orthogonal to the table upper surface 2f. The axial direction Da of the present embodiment is the vertical direction Dv in a case where the table 2 is set in the horizontal state. In the embodiment of the present disclosure, the outer diameter dimension of the tubular portion 11 gradually increases, for example, from a tube end 11a on one side (first side) toward a tube end 11b on the other side (second side) in the axial direction Da. The tubular portion 11 has a top surface 12, an outer circumferential surface 13 as a side surface, and an inner circumferential surface 14 as a side surface.

The top surface 12 is formed at an end portion of the tubular portion 11 in the axial direction Da. The top surface 12 is formed orthogonal to the axial direction Da. The top surface 12 is, between surfaces facing in the axial direction Da in the tubular portion 11 on the table 2, a surface not in contact with the table upper surface 2f. The top surface 12 of the present embodiment is a flat surface forming an annular shape when seen in the axial direction Da.

When seen in the direction orthogonal to the central axis 2c, the outer circumferential surface 13 extends in a direction intersecting with the top surface 12 from an outside end portion 12a of the top surface 12 on the outermost side in the radial direction Dr. The outer circumferential surface 13 of the present embodiment is a curving surface. The radial direction Dr of the present embodiment is a direction in which the axial line of the tubular portion 11 extends from the center and a horizontal direction Dh in a case where the table 2 is set in the horizontal state. When seen in the direction orthogonal to the central axis 2c, the inner circumferential surface 14 extends in the direction intersecting with the top surface 12 from an inside end portion 12b of the top surface 12 on the innermost side in the radial direction Dr.

The inner circumferential surface 14 of the present embodiment extends at an angle that is almost zero degree with respect to the outer circumferential surface 13. The inner circumferential surface 14 of the present embodiment is a curving surface.

(Order of Treatments in Metal Laminating Method)

Figure 4:
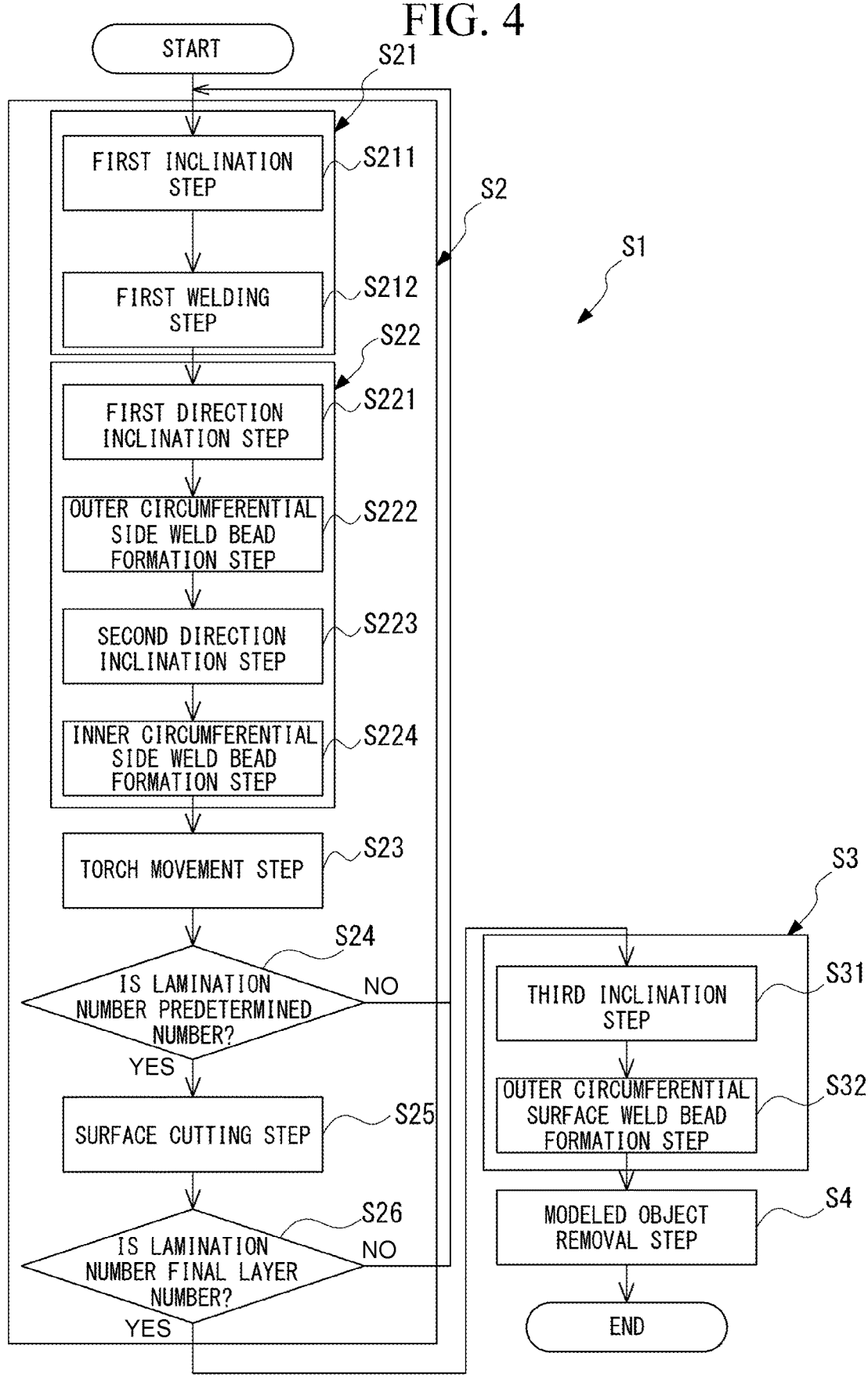
FIG. 4 is a flowchart showing the flow of the metal laminating and modeling method according to the embodiment of the present disclosure.

Next, a metal laminating and modeling method S1 carried out using the modeling system 1 will be described. FIG. 4 is a flowchart showing the flow of the metal laminating and modeling method. As shown in FIG. 4, in the metal laminating and modeling method S1, a three-dimensional modeled object is modeled by sequentially laminating a plurality of metal layers. The metal laminating and modeling method S1 of the present embodiment has a metal layer formation step S2, a side surface formation step (third inclination angle modeling step) S3, and a modeled object removal step S4.

(Metal Layer Formation Step)

In the metal layer formation step S2, a plurality of the weld beads 100 formed by arc welding is formed so as to be arranged in the horizontal direction Dh, thereby forming a metal layer 11m. The formation of the metal layer 11m is executed a plurality of times. The formation of the metal layer 11m is repeatedly executed, whereby the weld beads 100 are further laminated on the metal layer 11m that has been already formed. Therefore, a plurality of the metal layers 11m is laminated on the table upper surface 2f. The metal layer formation step S2 of the present embodiment has a first inclination angle modeling step S21, a second inclination angle modeling step S22, a torch movement step S23, a lamination number confirmation step S24, a surface cutting step S25, and a final lamination number confirmation step S26.

(First Inclination Angle Modeling Step)

In the first inclination angle modeling step S21, the table inclination angle of the table 2 and the torch inclination angle of the welding torch 5 are set to form the weld beads 100. The first inclination angle modeling step S21 includes a first inclination step S211 and a first welding step S212.

In the first inclination step S211, the table inclination angle and the torch inclination angle are changed. Specifically, in the first inclination step S211, the table inclination angle of the table 2 is set to a predetermined first table inclination angle θa1 by the control of the controller 6. In the first inclination step S211, the torch inclination angle of the welding torch 5 is set to a predetermined first torch inclination angle θb1 by the control of the controller 6. Here, the first table inclination angle θa1 is an angle including θa1=0°. In addition, the first torch inclination angle θb1 is an angle including θb1=0°. That is, in the first inclination step S211, the table 2 may be in a horizontal state in which the central axis 2c is disposed so as to extend in the vertical direction Dv, and the welding torch 5 may be in a vertical state in which the torch central axis 5c is disposed so as to extend in the vertical direction Dv.

In the present embodiment, in the first inclination step S211, the table 2 is driven so as to put the table upper surface 2f into a state of extending orthogonally with respect to the vertical direction Dv. That is, the table 2 is moved such that the table upper surface 2f becomes the horizontal plane. In addition, in the present embodiment, in the first inclination step S211, the torch holding member 52 is driven to put the welding torch 5 into a state in which the torch central axis 5c extends in the vertical direction Dv. That is, the welding torch 5 is moved so as to become perpendicular to the table upper surface 2f. As a result, the welding torch 5 is put into a state of being perpendicular to the table 2 maintained in a horizontal state so as to face straight the table upper surface 2f from above in the vertical direction Dv.

The first welding step S212 is carried out after the first inclination step S211. In the first welding step S212, after the first table inclination angle θa1 and the first torch inclination angle θb1 are determined in the first inclination step S211, the weld beads 100, which will become a part of the modeled object 10, are formed by arc welding in the welding torch 5.

Figure 5:
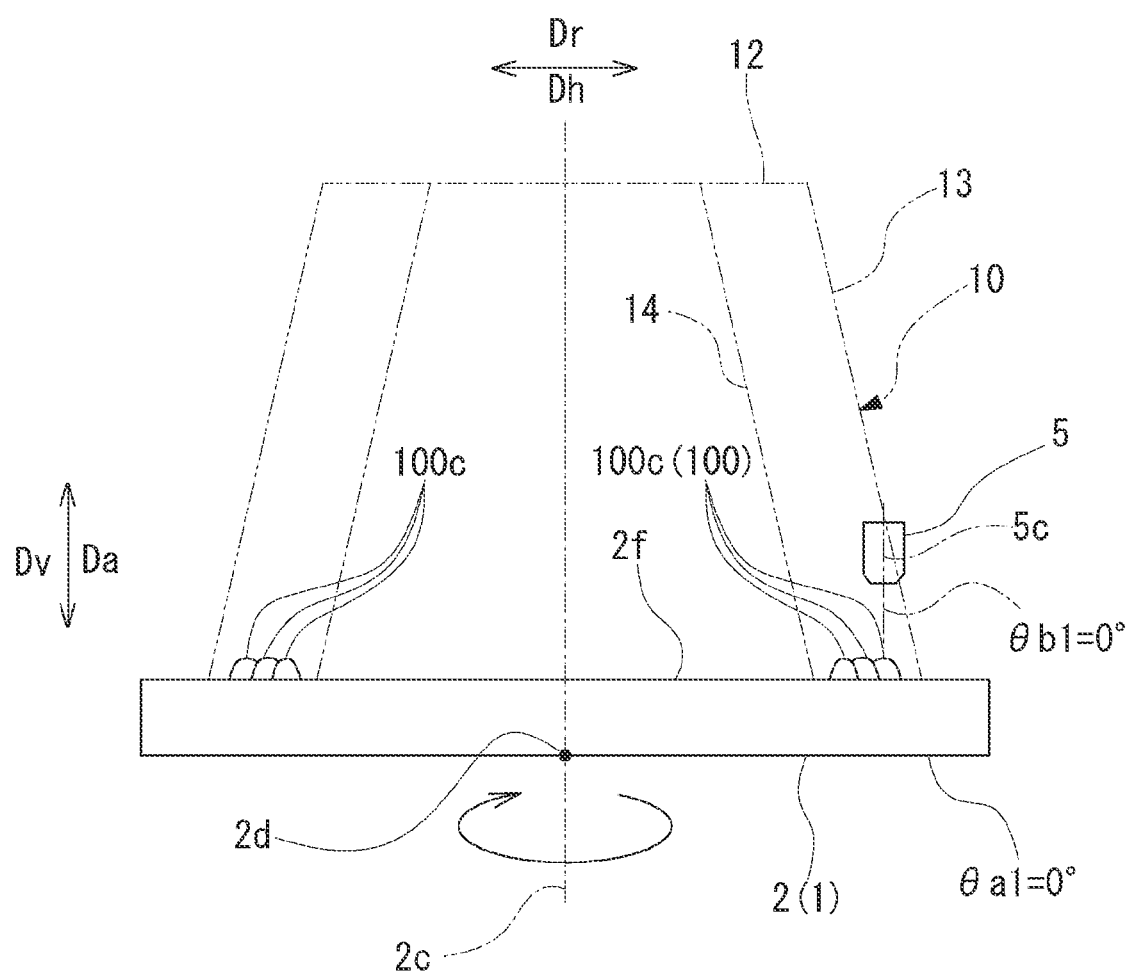
FIG. 5 is a view showing a state in which, in the metal laminating and modeling method according to the embodiment of the present disclosure, a plurality of weld beads is formed while a table is rotated in a horizontal state.

As shown in FIG. 5, in the first welding step S212, the weld beads 100 are formed using the welding torch 5 on the table 2 rotating around the central axis 2c. In the present embodiment, the first welding step S212 is carried out while the postures of the table 2 and the welding torch 5 determined in the first inclination step S211 are maintained. In the first welding step S212, the table 2 is rotated using the table rotary-driving unit 3 (refer to FIG. 1) around the central axis 2c at a predetermined rotation speed. The weld beads 100 are formed while the table 2 is rotated, whereby the weld beads 100 are continuously formed in a circular shape around the central axis 2c. In the first welding step S212, when reaching an end portion of the weld beads 100 in a circumferential direction around the central axis 2c, the welding torch 5 is moved in the radial direction Dr orthogonal to the central axis 2c. As a result, the weld beads 100 are formed side by side in a plurality of rows in the direction orthogonal to the central axis 2c. Therefore, a plurality of center weld beads 100c is formed along the table upper surface 2f so as to be overlapped in the horizontal direction Dh that is the direction in which the table upper surface 2f extends. The plurality of rows of center weld beads 100c forms a central region in the radial direction Dr in one metal layer 11m when seen in the direction orthogonal to the central axis 2c.

(Second Inclination Angle Modeling Step)

In the second inclination angle modeling step S22, at least one of the table inclination angle of the table 2 and the torch inclination angle of the welding torch 5 is set to a different value from the value in the first inclination angle modeling step S21 to form the weld beads 100. As shown in FIG. 4, the second inclination angle modeling step S22 of the present embodiment is carried out after the first inclination angle modeling step S21. The second inclination angle modeling step S22 includes a first direction inclination step S221 as a second inclination step, an outer circumferential side weld bead formation step (first end portion weld bead formation step) S222 as a second welding step, a second direction inclination step S223, and an inner circumferential side weld bead formation step (second end portion weld bead formation step) S224.

Figure 6:
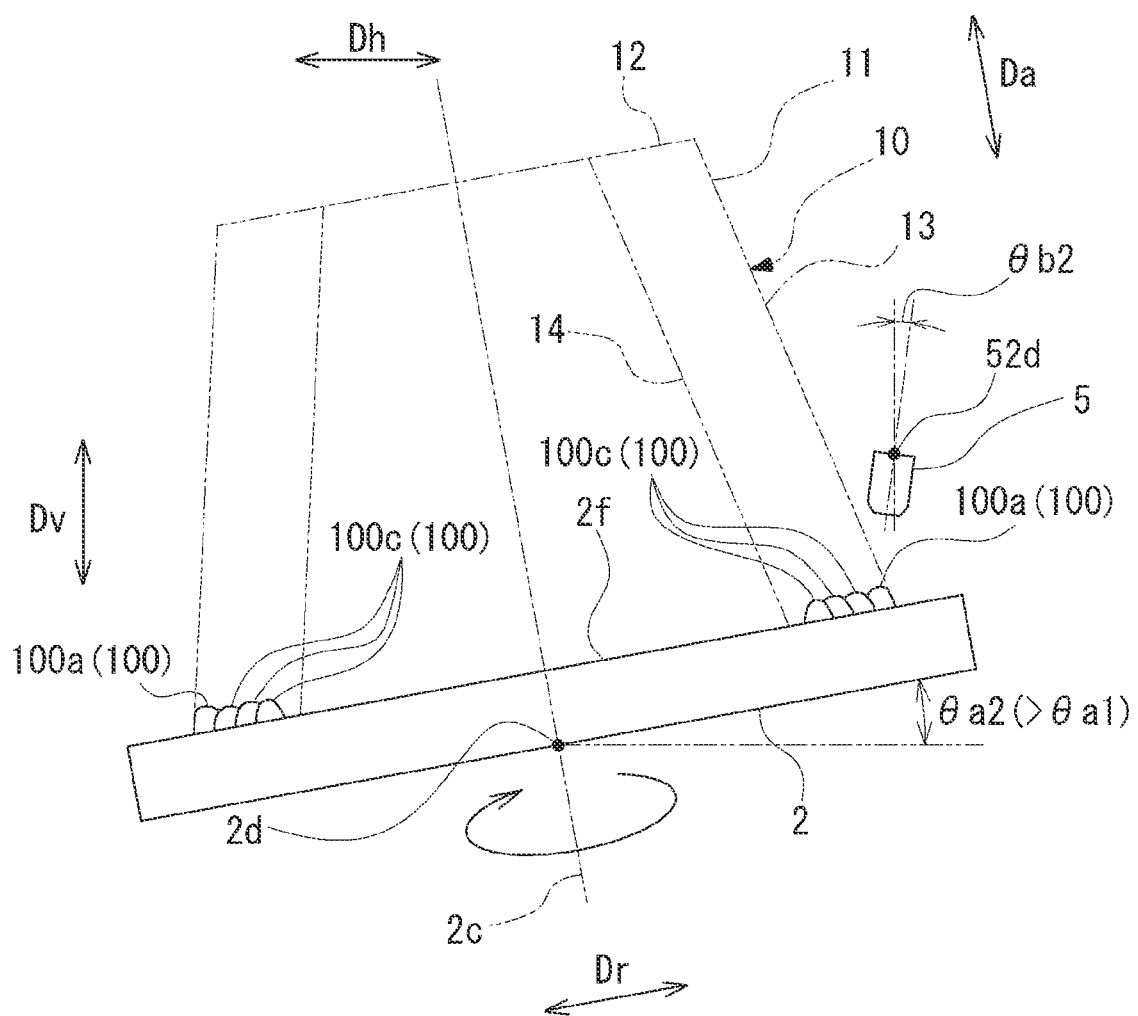
FIG. 6 is a view showing a state in which, in the metal laminating and modeling method according to the embodiment of the present disclosure, the table is inclined, thereby forming a weld bead at an end portion on an outside in a radial direction.

FIG. 6 is a view showing a state in which, in the metal laminating and modeling method S1, the table is inclined, thereby forming weld beads at an end portion on the outside in the radial direction Dr. As shown in FIG. 6, in the first direction inclination step S221, the table inclination angle of the table 2 is set to a second table inclination angle θa2 that is larger than the first table inclination angle θa1. The second table inclination angle θa2 is an angle of 0° or more and 90° or less. In the present embodiment, in the first direction inclination step S221, the table 2 is inclined from the horizontal state with the table tilting unit 4 (refer to FIG. 1). At this time, the table upper surface 2f faces in a first inclination direction. The first inclination direction is a direction intersecting with the vertical direction Dv when seen in the direction orthogonal to the central axis 2c. Therefore, in the first direction inclination step S221, the table upper surface 2f faces upward in the vertical direction Dv in a state in which the central axis 2c is inclined so as to form an acute angle with respect to the vertical direction Dv.

In addition, in the first direction inclination step S221, the torch inclination angle of the welding torch 5 is set to a second torch inclination angle θb2 set according to the second table inclination angle θa2. The second torch inclination angle θb2 is an angle of 0° or more and 90° or less. The second torch inclination angle θb2 may be different from the first torch inclination angle θb1 or may be the same as the first torch inclination angle θb1. In the present embodiment, in the first direction inclination step S221, the welding torch 5 is inclined at the second torch inclination angle θb2 that is larger than the first torch inclination angle θb1 that is 0°. As a result, the welding torch 5 is inclined so as to form an acute angle with respect to the vertical direction Dv and to form an obtuse angle with respect to the table upper surface 2f.

As shown in FIG. 4, the outer circumferential side weld bead formation step S222 is executed after the first direction inclination step S221. As shown in FIG. 6, the outer circumferential side weld bead formation step S222 is carried out on the table 2 maintained in a state of being inclined in the first inclination direction in the first direction inclination step S221. In the outer circumferential side weld bead formation step S222, the weld beads 100 are formed by arc welding with the welding torch 5. In the outer circumferential side weld bead formation step S222, a first end portion weld bead 100a is formed on, among the plurality of center weld beads 100c formed in the first welding step S212, the center weld bead 100c located at the uppermost end in the vertical direction Dv. That is, the first end portion weld bead 100a is formed in a state in which the table 2 is inclined such that the table upper surface 2f faces in the first inclination direction. The first end portion weld bead 100a is formed so as to overlap obliquely from above, among the center weld beads 100c, the outermost center weld bead 100c in the radial direction Dr when seen in the direction orthogonal to the central axis 2c. The first end portion weld beads 100a are continuously formed in the circumferential direction in a ring shape by rotating the table 2. The first end portion weld beads 100a form an outside region in the radial direction Dr in one metal layer 11m.

Here, regarding a current that is supplied to the welding torch in the outer circumferential side weld bead formation step S222, the current value is preferably set to be smaller than a current supplied to the welding torch in the first welding step S212.

Figure 7:
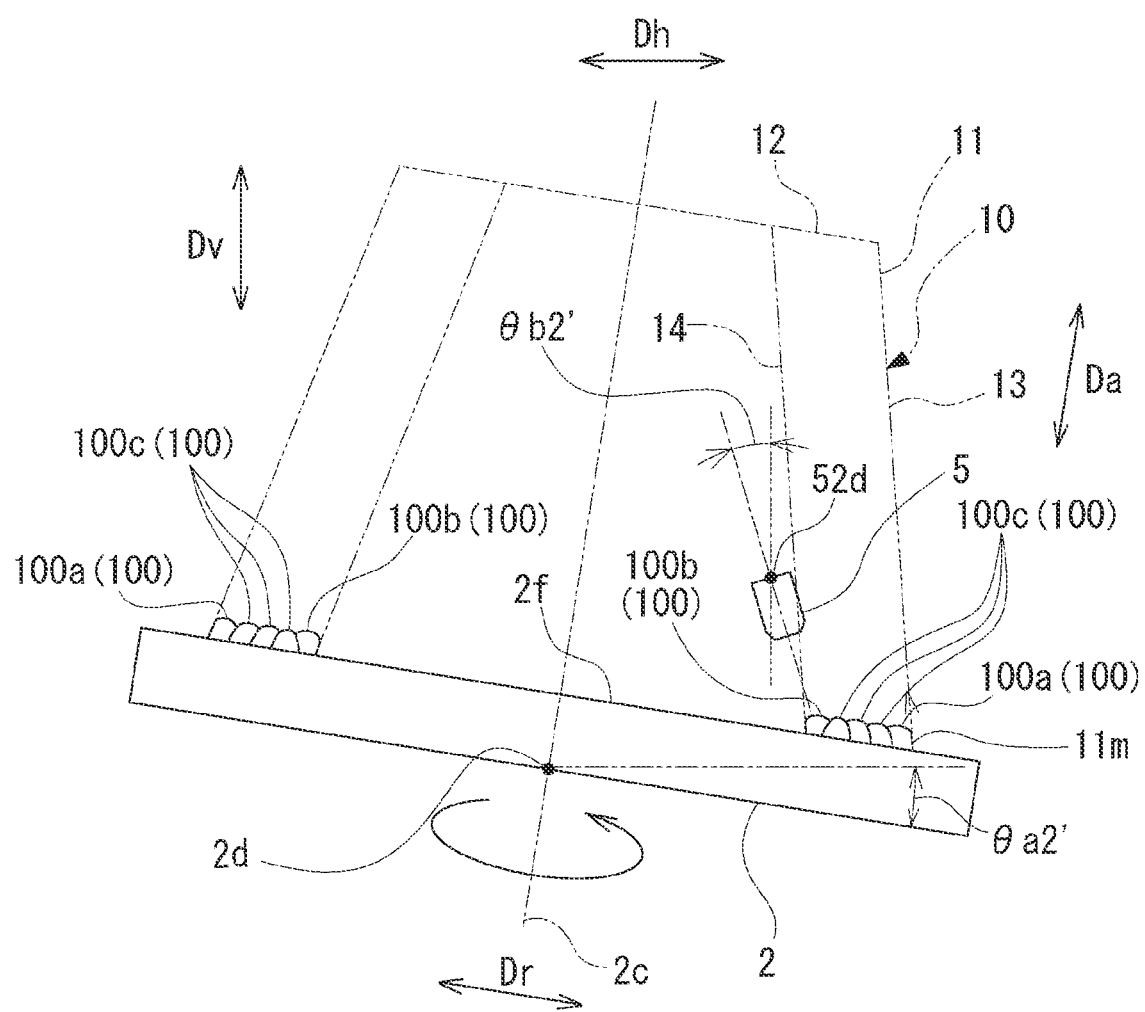
FIG. 7 is a view showing a state in which, in the metal laminating and modeling method according to the embodiment of the present disclosure, the table is inclined toward the opposite side of the table with respect to a vertical direction as a basis in FIG. 6, thereby forming a weld bead at an end portion on an inside in the radial direction.

As shown in FIG. 4, the second direction inclination step S223 is carried out after the outer circumferential side weld bead formation step S222. FIG. 7 is a view showing a state in which, in the metal laminating and modeling method, the table is inclined toward the opposite side of the table in FIG. 6 with respect to the vertical direction as a basis, thereby forming a weld bead at an end portion on an inside in the radial direction. In the second direction inclination step S223, the table 2 is inclined in a different direction from the state of being inclined in the first inclination direction. Specifically, in the second direction inclination step S223, the central axis 2c of the table 2 is returned to the vertical direction Dv from the first inclination direction using the table tilting unit 4 (refer to FIG. 1) and then inclined in the opposite direction. At this time, the table upper surface 2f faces in a second inclination direction. The second inclination direction is a direction intersecting with the vertical direction Dv on the opposite side of the first inclination direction with respect to the vertical direction Dv as the basis when seen in the direction orthogonal to the central axis 2c. That is, the second inclination direction of the present embodiment is a direction inclined in the opposite direction with respect to the vertical direction Dv at a second reverse table inclination angle θa2' that is substantially the same as the angle of the first inclination direction when seen in the direction orthogonal to the central axis 2c. The second reverse table inclination angle θa2' is an angle of 0° or more and 90° or less. The second reverse table inclination angle θa2' is preferably the same value as the second table inclination angle θa2 in the first direction inclination step S221 carried out immediately beforehand. Therefore, in the second direction inclination step S223, the table upper surface 2f faces upward in the vertical direction in a state in which the central axis 2c is inclined toward the opposite side compared with the central axis 2c in the first direction inclination step S221 so as to form an acute angle with respect to the vertical direction Dv.

In addition, in the second direction inclination step S223, the torch inclination angle of the welding torch 5 is set to a second reverse torch inclination angle θb2' set according to the second reverse table inclination angle θa2'. The second reverse table inclination angle θa2' is an angle of 0° or more and 90° or less. The second reverse table inclination angle θa2' is preferably the same value as the second torch inclination angle θb2 in the first direction inclination step S221 carried out immediately beforehand. In the present embodiment, in the second direction inclination step S223, regarding the torch inclination angle of the welding torch 5, the welding torch 5 is inclined at the second reverse torch inclination angle θb2' that is inclined toward the opposite side of the second torch inclination angle θb2 with respect to the vertical direction Dv as the basis. As a result, the welding torch 5 is inclined so as to form an acute angle with respect to the vertical direction Dv and to form an acute angle with respect to the table upper surface 2f.

As shown in FIG. 4, an inner circumferential side weld bead formation step S224 is carried out after the second direction inclination step S223. As shown in FIG. 7, the inner circumferential side weld bead formation step S224 is carried out on the table 2 maintained in a state of being inclined in the second inclination direction in the second direction inclination step S223. In the inner circumferential side weld bead formation step S224, a second end portion weld bead 100b is formed on, among the plurality of center weld beads 100c formed in the first welding step S212, the center weld bead 100c located at the uppermost end in the vertical direction Dv. The second end portion weld bead 100b is formed so as to overlap, among the plurality of center weld beads 100c, the center weld bead 100c located at an end opposite to the end at which the first end portion weld bead 100a is formed. That is, the second end portion weld bead 100b is formed in a state in which the table 2 is inclined such that the table upper surface 2f faces in the second inclination direction. The second end portion weld bead 100b is formed so as to overlap obliquely from above, among the center weld beads 100c, the innermost center weld bead 100c in the radial direction Dr when seen in the direction orthogonal to the central axis 2c. The second end portion weld beads 100b are continuously formed in the circumferential direction in a ring shape by rotating the table 2. The second end portion weld beads 100b form an inside region in the radial direction Dr in one metal layer 11m. When the inner circumferential side weld bead formation step S224 ends, as many metal layers 11m as required to form one layer are formed.

Here, regarding a current that is supplied to the welding torch in the inner circumferential side weld bead formation step S224, the current value is preferably set to be smaller than the current supplied to the welding torch in the first welding step S212. Specifically, the current value is preferably approximately the same as the current value of the current supplied to the welding torch in the outer circumferential side weld bead formation step S222.

Figure 8:
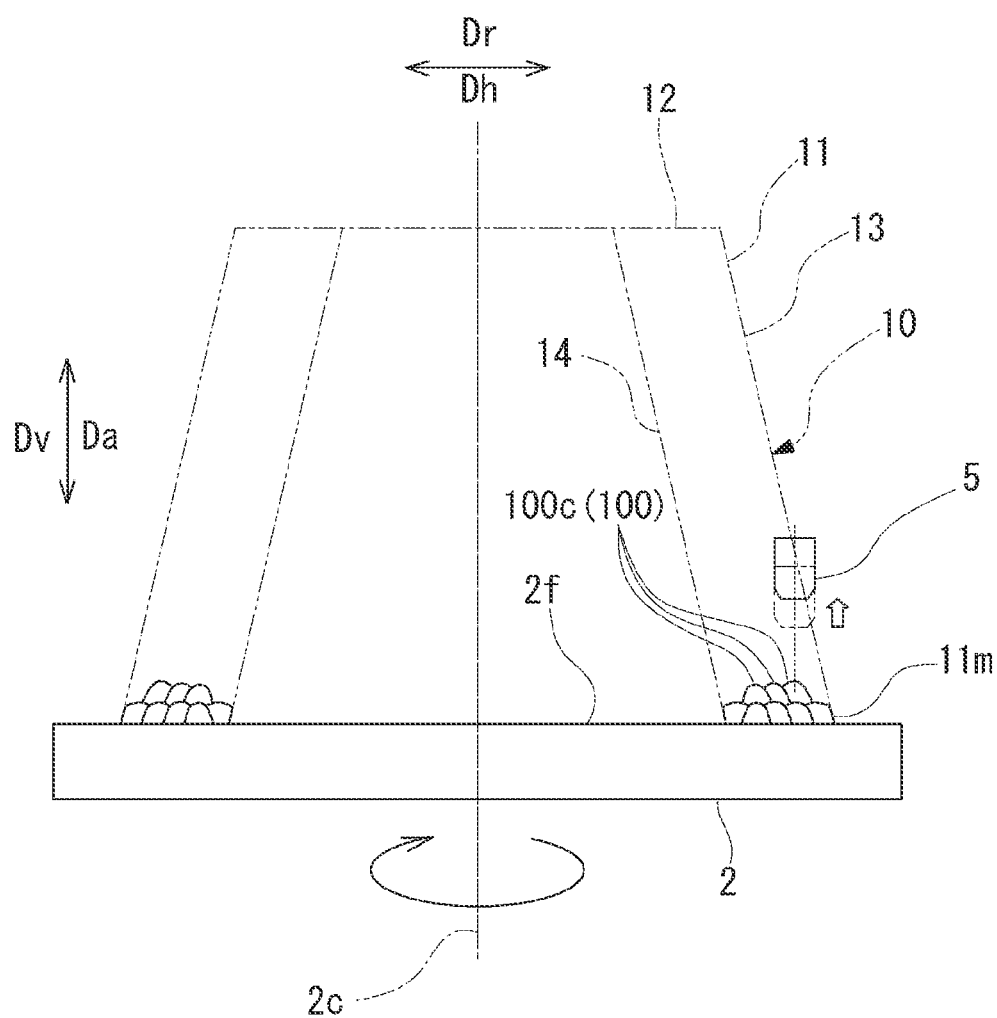
FIG. 8 is a view showing a state in which, in the metal laminating and modeling method according to the embodiment of the present disclosure, a torch is moved in an axial direction after one layer of metal layers is formed.

As shown in FIG. 4, the torch movement step S23 is carried out after the inner circumferential side weld bead formation step S224. FIG. 8 is a view showing a state in which, in the metal laminating and modeling method, the torch is moved in the axial direction after one layer of the metal layers is formed. As shown in FIG. 8, the torch movement step S23 moves the welding torch 5 in the axial direction Da as much as a dimension corresponding to the thickness of the metal layers 11m required to form one layer so as to be away from the table 2.

In the lamination number confirmation step S24, the number of the metal layers 11m laminated, which are formed by the first inclination step S211 through the inner circumferential side weld bead formation step S224, is confirmed. For the confirmation, whether or not the number of the metal layers 11m laminated reaches a previously-set predetermined number (for example, three layers to six layers) is determined by the controller 6. As a result, when the number of the metal layers 11m laminated does not reach the predetermined number, the first inclination step S211 is executed again. As this operation is repeated, the metal layers 11m are sequentially laminated gradually in the axial direction Da. As shown in FIG. 4, the lamination number confirmation step S24 of the present embodiment is carried out after the torch movement step S23. In a case where the number of the metal layers 11m laminated is determined to reach the predetermined number in the lamination number confirmation step S24, the process proceeds to the surface cutting step S25.

Figure 9:
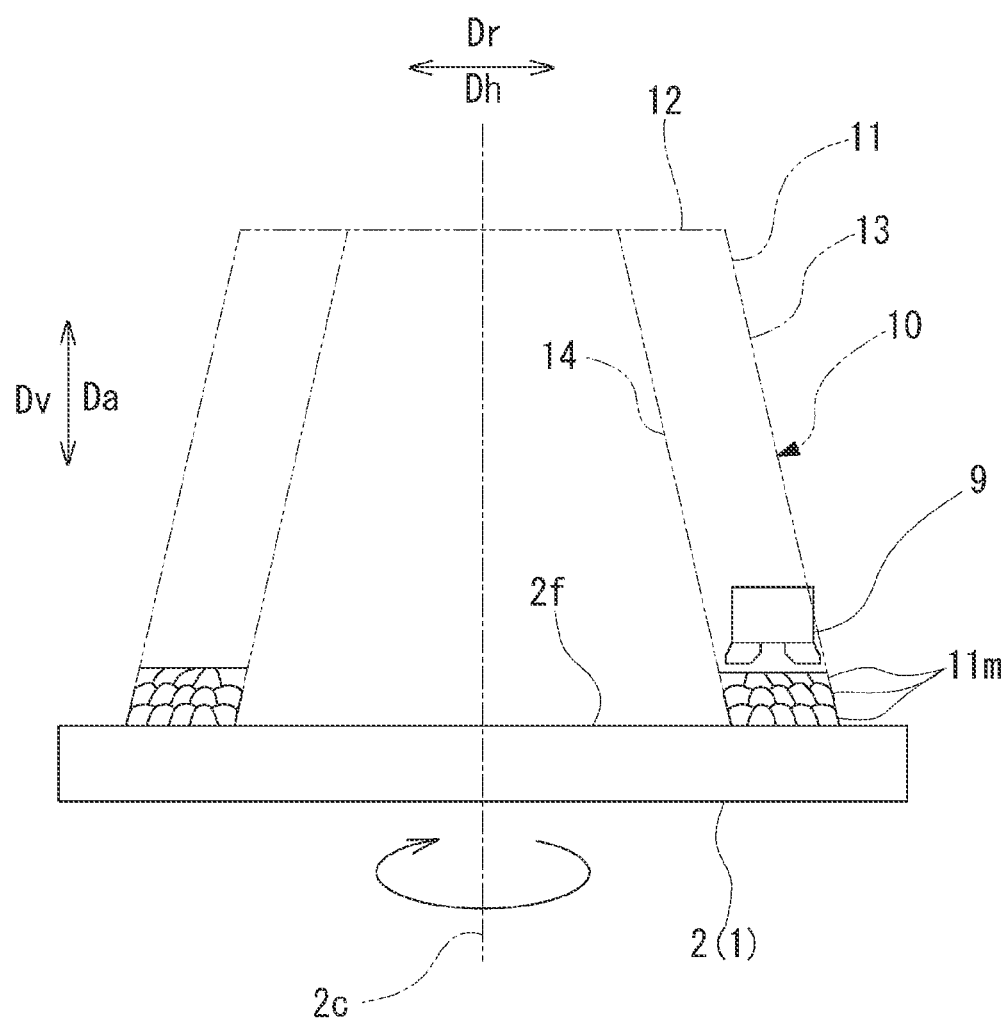
FIG. 9 is a view showing a state in which, in the metal laminating and modeling method according to the embodiment of the present disclosure, in a state in which the predetermined number of metal layers are laminated, an upper surface of the metal layers is cut.

FIG. 9 is a view showing a state in which, in the metal laminating and modeling method, the upper surface of the metal layers is cut in a state in which the predetermined number of the metal layers are laminated. The surface cutting step S25 is carried out after the lamination number confirmation step S24. In the surface cutting step S25, the upper surface of the predetermined number of the laminated metal layers 11m facing upward in the vertical direction Dv is cut using a cutting tool 9 and leveled to become almost a plane.

As shown in FIG. 4, the final lamination number confirmation step S26 is carried out after the surface cutting step S25. In the final lamination number confirmation step S26, whether or not the number of the metal layers 11m laminated after the cutting of the upper surface reaches a previously-set final number of layers is confirmed. For the confirmation, for example, whether or not the number of the metal layers 11m laminated reaches the previously-set final number of layers is determined by the controller 6. As a result, when the number of the metal layers 11m laminated after the beginning of the process does not reach the final number of layers, the process returns to the first direction inclination step S221, and the formation of another metal layer 11m begins. In addition, in the final lamination number confirmation step S26, in a case where the number of the metal layers 11m laminated reaches the final number of layers, the process proceeds to the side surface formation step S3 as the third inclination angle modeling step.

The side surface formation step S3 is carried out after the metal layer formation step S2. In the side surface formation step S3, the table 2 is inclined such that the first end portion weld beads 100a are disposed above in the vertical direction Dv, and a plurality of weld beads 100 is formed on the plurality of first end portion weld beads 100a, thereby forming the outer circumferential surface 13. The side surface formation step S3 of the present embodiment has a third inclination step S31 and an outer circumferential surface weld bead formation step S32 as a third welding step.

Figure 10:
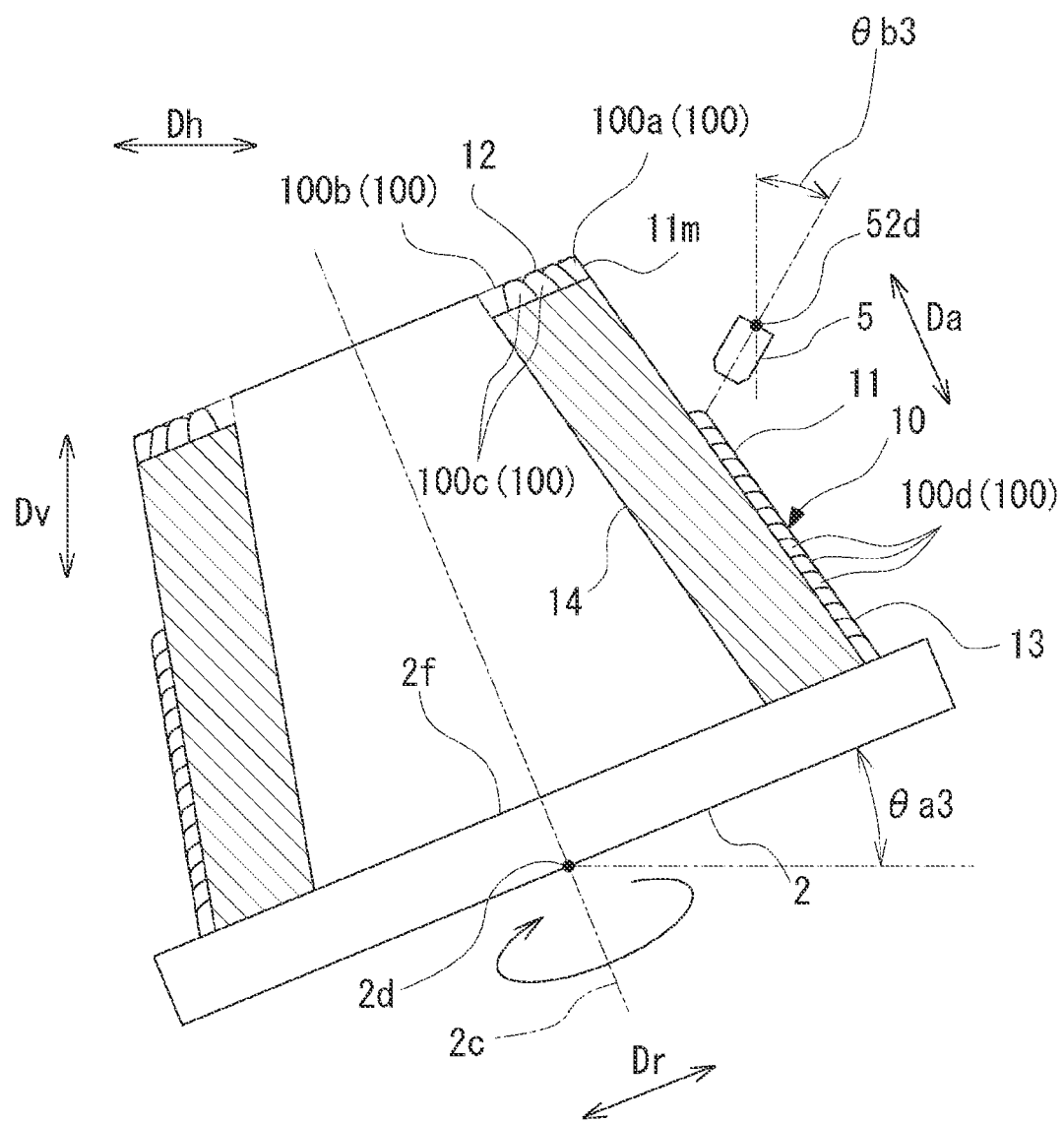
FIG. 10 is a view showing a state in which, in the metal laminating and modeling method according to the embodiment of the present disclosure, an outer circumferential surface of the modeled object is formed using the weld beads.

FIG. 10 is a view showing a state in which, in the metal laminating and modeling method, the outer circumferential surface of the modeled object is formed using the weld beads. As shown in FIG. 10, in the third inclination step S31, the table 2 is inclined at a third table inclination angle θa3 that is larger than the second table inclination angle θa2 such that the first end portion weld beads 100a of the plurality of metal layers 11m are disposed above in the vertical direction Dv with the table tilting unit 4 (refer to FIG. 1). In the third inclination step S31 of the present embodiment, the table upper surface 2f is inclined such that the outer circumferential surface 13 to be formed becomes almost parallel to the horizontal direction when seen in the direction orthogonal to the central axis 2c.

In addition, in the third inclination step S31, the torch inclination angle of the welding torch 5 is set to a third torch inclination angle θb3 set according to the third table inclination angle θa3. The third torch inclination angle θb3 may be different from the first torch inclination angle θb1 and the second torch inclination angle θb2 or may be the same as the first torch inclination angle θb1 and the second torch inclination angle θb2. In the present embodiment, in the third inclination step S31, the torch inclination angle of the welding torch 5 is set to the third torch inclination angle θb3 that is larger than the second torch inclination angle θb2.

As shown in FIG. 4, the outer circumferential surface weld bead formation step S32 is carried out after the third inclination step S31. As shown in FIG. 10, the outer circumferential surface weld bead formation step S32 is carried out on the table 2 maintained in a state of being inclined in the third inclination step S31. In the outer circumferential surface weld bead formation step S32, outer circumferential surface weld beads 100d are formed so as to overlap the plurality of first end portion weld beads 100a laminated in the axial direction Da. The outer circumferential surface weld beads 100d are continuously formed in the circumferential direction in a ring shape by rotating the table 2. The outer circumferential surface weld beads 100d are formed in a plurality of rows while the welding torch 5 is moved in the axial direction Da. Therefore, the plurality of outer circumferential surface weld beads 100d is formed side by side in the axial direction Da with no gap therebetween. As a result, the entire outer circumferential surface 13 of the tubular portion 11 is formed using the outer circumferential surface weld beads 100d. The modeled object 10 having a predetermined shape is formed on the table 2 as described above.

As shown in FIG. 4, the modeled object removal step S4 is carried out after the side surface formation step S3. In the modeled object removal step S4, the modeled object 10 formed on the table 2 is separated and removed from the table 2. Therefore, the modeling of the modeled object 10 ends.

According to the metal laminating and modeling method S1 as described above, in the first inclination angle modeling step S21, the table 2 is set at the first table inclination angle θa1, and the welding torch 5 is inclined at the first torch inclination angle θb1. In this state, the weld beads 100 are formed. In addition, in the second inclination angle modeling step S22, the table 2 is inclined at the second table inclination angle θa2, and the welding torch 5 is inclined at the second torch inclination angle θb2. In this state, the weld beads 100 are further formed. As described above, the weld beads 100 are laminated while the table 2 and the welding torch 5 are inclined, thereby forming the modeled object 10. Therefore, it is possible to reduce the angles at which the table 2 and the welding torch 5 are inclined, respectively, compared with a case where only one of the table 2 and the welding torch 5 is inclined. For example, in a case where the modeled object 10 to be formed is large, it is necessary to secure a space for inclining the table 2 in consideration of the final shape of the modeled object 10. Furthermore, in the case of a large modeled object 10, when the angle at which the table 2 is inclined becomes large, there is a possibility that the modeled object 10 may fall from the table 2 in the middle of the formation due to the weight of the modeled object 10. However, since the table inclination angle is suppressed, it is possible to reduce the space for the inclination of the table 2, and the modeled object 10 is also less likely to fall. As a result, it is possible to form a large modeled object 10 while suppressing an increase in the sizes of apparatuses.

In addition, it is possible to change the angle of the welding torch 5 in a state in which the table 2 is inclined. Therefore, even when the shape of the modeled object 10 is complicated, it is possible to form the weld beads 100 while moving the welding torch 5 so as to avoid the metal layers 11m in order to prevent the welding torch 5 from being impeded by the metal layers 11m.

In addition, in the second inclination angle modeling step S22, the table inclination angle of the table 2 is larger than the table inclination angle in the first inclination angle modeling step S21, and the metal of the weld bead 100 in a molten state is likely to flow according to the inclination of the table 2. In this case, the current value of the current that is supplied to the welding torch 5 is reduced, whereby it is possible to suppress the careless flow of the metal of the weld beads 100.

In addition, when the table 2 is inclined in the first direction inclination step S221, the table upper surface 2f inclines. In the outer circumferential side weld bead formation step S222, in this state, the first end portion weld beads 100a are formed so as to overlap, among the plurality of center weld beads 100c arranged on the table upper surface 2f, the outermost center weld beads 100c in the radial direction Dr at the upper end. As a result, at the point in time at which the first end portion weld beads 100a have been formed using the welding torch 5, the first end portion weld beads 100a are located above the center weld beads 100c when seen in the direction orthogonal to the central axis 2c. At the moment of being formed, the first end portion weld beads 100a are in a molten state and thus flow inward in the radial direction Dr toward the center weld beads 100c due to the force of gravity. That is, the first end portion weld beads 100a do not flow to the outside in the radial direction Dr where the center weld beads 100c are not formed. As a result, it is possible to prevent the outer circumferential surface 13 of the modeled object 10 from forming a shape having large protrusions and recesses due to the plurality of first end portion weld beads 100a that hang down. Therefore, it is possible to produce a favorable outer circumferential surface having a small number of protrusions and recesses even when the outer circumferential surface 13 of the modeled object 10 is not pruned. Therefore, the quality of the modeled object 10 can be improved without carrying out an additive process or the like.

Furthermore, the first end portion weld beads 100a in a molten state are blocked by the center weld bead 100c. That is, it is not possible for the first end portion weld beads 100a to flow downward past the center weld beads 100c. Therefore, the first end portion weld beads 100a hanging and adversely affecting the inside region in the radial direction Dr are suppressed.

Similarly, when the table 2 is inclined in the second direction inclination step S223, the table upper surface 2f inclines. In the inner circumferential side weld bead formation step S224, in this state, the second end portion weld beads 100b are formed so as to overlap, among the plurality of weld beads 100 arranged in the horizontal direction on the table upper surface 2f, the innermost center weld beads 100c in the radial direction Dr at the upper end. As a result, at a point in time at which the second end portion weld beads 100b have been formed using the welding torch 5, the second end portion weld beads 100b are located above the center weld beads 100c when seen in the direction orthogonal to the central axis 2c. At the moment of being formed, the second end portion weld beads 100b are in a molten state and thus flow outward in the radial direction Dr toward the center weld beads 100c due to the force of gravity. That is, the second end portion weld beads 100b do not flow to the inside in the radial direction Dr where the center weld beads 100c are not formed. As a result, it is possible to prevent the inner circumferential surface 14 of the modeled object 10 from forming a shape having large protrusions and recesses due to the plurality of second end portion weld beads 100b that hang down. Therefore, it is possible to produce a favorable inner circumferential surface having a small number of protrusions and recesses even when the inner circumferential surface 14 of the modeled object 10 is not pruned. Therefore, it is possible to improve the qualities of two different surfaces intersecting with the top surface 12 of the modeled object 10 without carrying out an additive process or the like.

Furthermore, the second end portion weld beads 100b in a molten state are blocked by the center weld beads 100c. That is, it is not possible for the second end portion weld beads 100b to flow downward past the center weld heads 100c. Therefore, the second end portion weld beads 100b hanging and adversely affecting the outside region in the radial direction Dr are suppressed.

In addition, when seen in the direction orthogonal to the central axis 2c, the table 2 is inclined such that the outer circumferential surface 13 to be formed becomes almost parallel to the horizontal direction. In this state, the outer circumferential surface weld beads 100d are formed so as to overlap the plurality of first end portion weld beads 100a. Therefore, even when there are a small number of protrusions and recesses or the like on the surface of the first end portion weld beads 100a arranged in the axial direction Da, the protrusions and the recesses are buried by the outer circumferential surface weld beads 100d to be newly formed. As a result, a leveled outer circumferential surface 13 is formed. Therefore, it is possible to further enhance the finish quality of the outer circumferential surface 13 and to make the cutting process time of the outer circumferential surface 13 short or unnecessary.

In addition, the metal layers 11u having the first end portion weld beads 100a and the second end portion weld beads 100b are sequentially laminated in the axial direction Da, whereby it is possible to trim the outer circumferential surface 13 and the inner circumferential surface 14 without carrying out an additive process or the like. Therefore, it is possible to enhance the quality of the modeled object 10 to be formed and to make the cutting process times of the outer circumferential surface 13 and the inner circumferential surface 14 short or unnecessary.

While preferred embodiments of the invention have been described and illustrated above, it should be understood that these are exemplary examples of the invention and are not to be considered as limiting. Additions, omissions, substitutions, and other modifications can be made without departing from the scope of the invention. Accordingly, the invention is not to be considered as being limited by the foregoing description, and is only limited by the scope of the appended claims.

For example, the shape of the modeled object 10 to be formed is simply an example and may be a different appropriate shape. For example, the modeled object 10 may have a cylindrical shape, a rectangular cylindrical shape, or the like having a constant diameter dimension in the axial direction Da. In addition, the modeled object 10 is not limited to a tubular shape and may have, for example, a plate shape or the like as long as the modeled object has the top surface 12 and a side surface intersecting with the top surface 12.

In addition, in the first inclination angle modeling step S21, the table 2 or the welding torch 5 is not limited to be not inclined in the first inclination step S211. That is, in the first inclination step S211, the first table inclination angle $\theta a1$ and the first torch inclination angle $\theta b1$ is not limited to be 0°. In the first inclination step S211, the table 2 may be inclined such that only the first table inclination angle $\theta a1$ becomes larger than 0°. In addition, in the first inclination step S211, the welding torch 5 may be inclined such that only the first torch inclination angle $\theta b1$ becomes larger than 0°. Furthermore, in the first inclination step S211, both the table 2 and the welding torch 5 may be inclined such that both the first table inclination angle $\theta a1$ and the first torch inclination angle $\theta b1$ become larger than 0°.

In addition, in the first direction inclination step S221, which is the second inclination step, in a case where the table 2 has been inclined in the first inclination step S211, the table 2 is inclined in the same direction so as to be further inclined from the inclined state in the first inclination step S211. Similarly, in a case where the welding torch 5 has been inclined in the first inclination step S211, the welding torch 5 is inclined in the same direction so as to be further inclined from the inclined state in the first inclination step S211.

In addition, the first inclination angle modeling step S21 is not limited to be carried out after the second inclination angle modeling step S22 as in the present embodiment. For example, the first inclination angle modeling step S21 may be carried out after the second inclination angle modeling step S22. That is, after the second inclination angle modeling step is carried out in a state in which the table 2 or the welding torch 5 is significantly inclined, the first inclination angle modeling step may be carried out by reducing the inclination of the table 2 or the welding torch 5.

In addition, in the present embodiment, the first end portion weld beads 100a are formed in the outer circumferential side weld bead formation step S222, and the second end portion weld beads 100b are formed in the inner circumferential side weld bead formation step S224. However, in the metal laminating and modeling method S1, it is not always necessary to carry out both the outer circumferential side weld bead formation step S222 and the inner circumferential side weld bead formation step S224. That is, in the metal laminating and modeling method S1, only one of the outer circumferential side weld bead formation step S222 and the inner circumferential side weld bead formation step S224 may be carried out. Therefore, when only the inner circumferential side weld bead formation step S224 is carried out, the weld beads 100 formed in the inner circumferential side weld bead formation step S224 become the first end portion weld beads.

In addition, in the embodiment, the upper surface of the metal layers 11m is cut using the cutting tool 9 each time when the predetermined number of metal layers 11m are laminated in the surface cutting step S25, but the configuration is not limited thereto. The surface cutting step S25 may be omitted, and the metal layers 11m may be sequentially laminated until the final layer of the metal layer 11m is formed.

In addition, in the embodiment, in the outer circumferential surface weld bead formation step S32, the outer circumferential surface weld beads 100d are formed using the welding torch 5 to form the outer circumferential surface 13, but the configuration is not limited to the formation of the outer circumferential surface 13 as described above. For example, the outer circumferential surface weld bead formation step S32 may be omitted. In this case, regarding the outer circumferential surface 13, a surface formed of the first end portion weld beads 100a sequentially laminated becomes the outer circumferential surface of the tubular portion 11.

APPENDIX

The metal laminating and modeling method S1 described in the embodiment is understood, for example, as described below.

(1) A metal laminating and modeling method S1 according to a first aspect is a metal laminating and modeling method S1 for forming a modeled object 10 by sequentially laminating metal layers 11m, the method including a first inclination angle modeling step S21 including a first inclination step S211 of setting a table 2 on which the metal layers 11m are to be formed at a first table inclination angle θa1 and setting a welding torch 5 at a first torch inclination angle θb1 and a first welding step S212 of forming a weld bead 100 that becomes a part of the modeled object 10 by arc welding with the welding torch 5 and a second inclination angle modeling step S22 including a second inclination step S221 of inclining the table 2 at a second table inclination angle θa2 that is larger than the first table inclination angle θa1 and setting the welding torch 5 at a second torch inclination angle θb2 set according to the second table inclination angle θa2 and a second welding step S222 of forming the weld bead 100 by arc welding with the welding torch 5.

It should be noted that the first table inclination angle θa1 includes the horizontal state in which the table upper surface 2f of the table 2 is directed upward in the vertical direction Dv. In addition, the first torch inclination angle θb1 includes the vertical state (θb1=0) in which the torch central axis 5c of the welding torch 5 extends in the vertical direction Dv.

In addition, the metal laminating and modeling method S1 includes both a case where the second inclination angle modeling step S22 is executed after the first inclination angle modeling step S21 and a case where the first inclination angle modeling step S21 is executed after the second inclination angle modeling step S22.

In this metal laminating and modeling method S1, the weld beads 100 are laminated while the table 2 and the welding torch 5 are inclined, thereby forming the modeled object 10. Therefore, it is possible to reduce the angles at which the table 2 and the welding torch 5 are inclined, respectively, compared with a case where only one of the table 2 and the welding torch 5 is inclined. For example, in a case where the modeled object 10 to be formed is large, it is necessary to secure a space for inclining the table 2 in consideration of the final shape of the modeled object 10. Furthermore, in the case of a large modeled object 10, when the angle at which the table 2 is inclined becomes large. There is a possibility that the modeled object 10 may fall from the table 2 in the middle of the formation due to the weight of the modeled object 10. However, since the table inclination angle is suppressed, it is possible to reduce the space for the inclination of the table 2, and the modeled object 10 is also less likely to fall. As a result, it is possible to form a large modeled object 10 while suppressing an increase in the sizes of apparatuses.

(2) A metal laminating and modeling method S1 according to a second aspect is the metal laminating and modeling method S1 of (1), in which a current that is supplied to the welding torch 5 in the second welding step S222 has a current value smaller than a current that is supplied to the welding torch 5 in the first welding step S212.

In the second inclination angle modeling step S22, the inclination angle of the table 2 is larger than the inclination angle in the first inclination angle modeling step S21, and the metal of the weld bead 100 in a molten state is likely to flow according to the inclination of the table 2. In this case, the current value of the current that is supplied to the welding torch 5 is reduced, whereby it is possible to suppress the careless flow of the metal of the weld beads 100.

(3) A metal laminating and modeling method S1 according to a third aspect is the metal laminating and modeling method S1 of (1) or (2), in which, in the first inclination angle modeling step S21, a plurality of the weld beads 100 is formed so as to overlap each other in an extending direction of an upper surface of the table 2 in the first welding step S212, and in the second inclination angle modeling step S22, the table 2 is inclined at the second table inclination angle θa2 so that the upper surface faces in a first inclination direction that intersects with a vertical direction Dv in the second inclination step S221, and, in the second welding step S222, a first end portion weld bead 100a is formed so as to overlap the weld bead 100 that is located at a farthest end and above in the vertical direction Dv among the plurality of weld beads 100 formed in the first welding step S212.

Therefore, at a point in time at which the first end portion weld beads 100a have been formed, the first end portion weld beads 100a are located above the plurality of weld beads 100. At the moment of being formed, the first end portion weld beads 100a are in a molten state and thus flow toward the side where the plurality of weld beads 100 are formed due to the force of gravity. That is, the first end portion weld beads 100a do not flow toward a side where the plurality of weld beads 100 is not formed. As a result, it is possible to prevent the side surface 13 of the modeled object 10 from forming a shape having large protrusions and recesses due to the weld beads 100 that hang down. Therefore, it is possible to make the side surface 13 of the modeled object 10 a favorable side surface having a small number of protrusions and recesses. Furthermore, it is not necessary to wait for the weld beads 100 to be cooled to a predetermined temperature, and thus the modeling time can be shortened.

(4) A metal laminating and modeling method S1 according to a fourth aspect is the metal laminating and modeling method S1 of (3), in which the second inclination angle modeling step S22 includes, after the second welding step S222, a second direction inclination step S223 of inclining the table 2 at the second table inclination angle θa2 so that the upper surface faces in a second inclination direction that intersects with the vertical direction Dv on an opposite side of the first inclination direction with respect to the vertical direction Dv as a basis, and a second end portion weld bead formation step S224 of forming a second end portion weld bead 100b so as to overlap the weld bead 100 located at an end on a side opposite to a side on which the first end portion weld bead 100a is formed and above in the vertical direction Dv among the plurality of weld beads 100 formed in the first welding step S212.

Therefore, at a point in time at which the second end portion weld beads 100b have been formed, the second end portion weld beads 100b are located above the plurality of weld beads 100. At the moment of being formed, the second end portion weld beads 100b are in a molten state and thus flow toward the side where the plurality of weld beads 100 are formed due to the force of gravity. However, the second end portion weld beads 100b in a molten state are blocked by the plurality of weld beads 100 and are not capable of flowing downward any further. Therefore, it is possible to make a side surface 14 that faces the side opposite to the side surface 13 a favorable side surface having a small number of protrusions and recesses. Therefore, it is possible to improve the qualities of two surfaces of the side surface 13 of the modeled object 10 and the side surface 14 facing the side opposite to the side surface 13 without carrying out an additive process or the like.

(5) A metal laminating and modeling method S1 according to a fifth aspect is the metal laminating and modeling method S1 of (3) or (4), in which the first inclination angle modeling step S21 and the second inclination angle modeling step S22 are executed a plurality of times so as to laminate the weld beads 100 on the formed metal layers 11m.

Therefore, the metal layers 11m having the first end portion weld bead 100a are sequentially laminated, whereby it is possible to enhance the quality of the modeled object 10 and to shorten or eliminate the cutting process time of the side surfaces 13 and 14.

(6) A metal laminating and modeling method S1 according to a sixth aspect is the metal laminating and modeling method S1 of (5), the method further including a third inclination angle modeling step S3 including a third inclination step S31 of laminating a plurality of the metal layers 11m by executing the first inclination angle modeling step S21 and the second inclination angle modeling step S22 a plurality of times and then inclining the table 2 at a third table inclination angle θa3 that is larger than the first table inclination angle θa1 such that the first end portion weld beads 100a are disposed above and a third welding step S32 of forming a side surface of the modeled object 10 by forming a plurality of the weld beads 100 on the plurality of first end portion weld beads 100a by arc welding with the welding torch 5.

Therefore, the weld beads 100 are formed so as to overlap the plurality of first end portion weld beads 100a. Therefore, even when there are a small number of protrusions and recesses or the like on the surface of the arranged first end portion weld beads 100a, the protrusions and the recesses or the like are buried by weld beads 100 to be newly formed. As a result, a leveled side surface 13 is formed. Therefore, it is possible to further enhance the finish quality of the side surface 13.

EXPLANATION OF REFERENCES 1 modeling system
2 table
2f table upper surface
2c central axis
2d tilting axis
3 table rotary-driving unit
4 table tilting unit
5 welding torch
5c torch central axis
6 controller
7 torch driving unit
8 current supply unit
10 modeled object
11 tubular portion
11m metal layer
11a, 11b tube end
12 top surface
13 outer circumferential surface (side surface)
14 inner circumferential surface (side surface)
51 frame
52 torch holding member
52c holding member rotating axis
52d torch tilting axis
61 CPU
62 ROM
63 RAM
64 HDD
65 signal sending and receiving module
70 signal receiving portion
71 rotation control portion
72 tilt control portion
73 torch operation control portion
74 welding control portion
100 weld bead
100a first end portion weld bead
100b second end portion weld bead
Dv vertical direction
Dh horizontal direction
Da axial direction
Dr radial direction
S1 metal laminating and modeling method
S21 first inclination angle modeling step
S211 first inclination step
S212 first welding step
S22 second inclination angle modeling step
S221 first direction inclination step (second inclination step)
S222 outer circumferential side weld bead formation step (second welding step)
S223 second direction inclination step
S224 inner circumferential side weld bead formation step (second end portion weld bead formation step)
S3 third inclination angle modeling step
S31 third inclination step
S32 outer circumferential surface weld bead formation step (third welding step)
θa1 first table inclination angle
θa2 second table inclination angle
θa2' second reverse table inclination angle
θa3 third table inclination angle
θb1 first torch inclination angle
θb2 second torch inclination angle
θb2' second reverse torch inclination angle

What is claimed is:

1. A metal laminating and modeling method for forming a modeled object by sequentially laminating metal layers, the method comprising:

a metal layer formation step of forming a plurality of weld beads formed by arc welding so as to be arranged in a horizontal direction, thereby forming a metal layer on a table, wherein the metal layer formation step includes:
- a first inclination angle modeling step of forming the plurality of the weld beads by setting a table inclination angle of the table and a torch inclination angle of a welding torch; and
- a second inclination angle modeling step of forming the plurality of the weld beads by setting at least one of the table inclination angle and the torch inclination angle to a different value from that values of the table inclination angle and the torch inclination angle in the first inclination angle modeling step, wherein the table inclination angle is an angle formed by a horizontal plane and an upper surface of the table, wherein the torch inclination angle is an angle between a rotating axis of the welding torch extending in a vertical direction and a central axis of the welding torch, wherein the first inclination angle modeling step includes:
- a first inclination step of setting the table on which the metal layers are to be formed at a first table inclination angle and setting the welding torch at a first torch inclination angle; and
- a first welding step of forming the weld beads that become a part of the modeled object by the arc welding with the welding torch, wherein the plurality of the weld beads are formed so as to overlap each other in a direction in which an upper surface of the table is extending in the first welding step, wherein the second inclination angle modeling step includes:
- a first direction inclination step of inclining the table at a second table inclination angle that is larger than the first table inclination angle and setting the welding torch at a second torch inclination angle set according to the second table inclination angle,
  - wherein the table is inclined at the second table inclination angle so that the upper surface faces in a first inclination direction that intersects with the vertical direction in the first direction inclination step,
- a second welding step of forming the weld beads by the arc welding with the welding torch, and
- a second direction inclination step of tilting the table at the second table inclination angle so that a central axis of the table is returned to the vertical direction from the first inclination direction and then inclined in a second tilting direction, which is the opposite direction of the first inclination direction, after the second welding step, wherein, in the second welding step, a first end portion weld bead is formed so as to overlap the weld bead that is located at a farthest end and above in the vertical direction among the plurality of weld beads formed in the first welding step, wherein the second inclination angle modeling step further includes a second end portion weld bead formation step of forming a second end portion weld bead so as to overlap the weld bead located at an end on a side opposite to a side on which the first end portion weld bead is formed and above in the vertical direction among the plurality of weld beads formed in the first welding step, wherein the second end portion weld bead formation step is carried out after the second direction inclination step, wherein the metal laminating and modeling method further comprises:
- a third inclination angle modeling step including a third inclination step of inclining the table at a third table inclination angle that is larger than the first table inclination angle such that the first end portion weld beads are disposed above after a plurality of the metal layers is formed by executing the first inclination angle modeling step and the second inclination angle modeling step a plurality of times; and
- a third welding step of forming a side surface of the modeled object by forming a plurality of outer circumferential surface weld beads on a plurality of first end portion weld beads by arc welding with the welding torch, and wherein in the third welding step, the plurality of outer circumferential surface weld beads are formed so as to overlap the plurality of first end portion weld beads, and protrusions and recesses on a surface of the plurality of first end portion weld beads are buried by the plurality of outer circumferential surface weld beads.

2. The metal laminating and modeling method according to claim 1,
wherein a current that is supplied to the welding torch in the second welding step has a current value smaller than a current that is supplied to the welding torch in the first welding step.

3. The metal laminating and modeling method according to claim 1,
wherein the first inclination angle modeling step and the second inclination angle modeling step are executed a plurality of times so as to laminate the weld beads on the formed metal layers.

* * * * *